US012509233B2

United States Patent
Brito et al.

(10) Patent No.: US 12,509,233 B2
(45) Date of Patent: Dec. 30, 2025

(54) SPLIT FRONT HOUSING OF AIRCRAFT MOTOR FOR HIGH-POWER EXTRACTION FOR MOUNTED EXTERNAL ACCESSORIES

(71) Applicant: Pratt & Whitney Canada Corp., Longueuil (CA)

(72) Inventors: Roberto Brito, Beloeil (CA); Michel Desjardins, Saint-Hubert (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 179 days.

(21) Appl. No.: 18/340,340

(22) Filed: Jun. 23, 2023

(65) Prior Publication Data

US 2024/0425185 A1 Dec. 26, 2024

(51) Int. Cl.
*B64D 27/02* (2006.01)
*F01D 15/12* (2006.01)
*F01D 25/24* (2006.01)

(52) U.S. Cl.
CPC ............. *B64D 27/02* (2013.01); *F01D 15/12* (2013.01); *F01D 25/24* (2013.01)

(58) Field of Classification Search
CPC .... F01D 15/12; F02C 7/32; F05D 2260/4031; F16H 1/206; F16H 1/22
See application file for complete search history.

(56) References Cited

U.S. PATENT DOCUMENTS

| | | | |
|---|---|---|---|
| 10,662,878 B2 | 5/2020 | Alstad et al. | |
| 10,731,566 B2 | 8/2020 | Alstad et al. | |
| 11,174,916 B2 * | 11/2021 | Desjardins | F16H 57/08 |
| 2015/0308350 A1 * | 10/2015 | Dobosz | F16H 1/222 74/15.63 |
| 2016/0230843 A1 * | 8/2016 | Duong | F02C 7/32 |
| 2017/0314469 A1 | 11/2017 | Roever | |

FOREIGN PATENT DOCUMENTS

JP 2001317376 A 11/2001

OTHER PUBLICATIONS

Extended European Search Report for EP Application No. 24184084.2, dated Nov. 5, 2024, pp. 1-8.

* cited by examiner

*Primary Examiner* — Courtney D Heinle
*Assistant Examiner* — Danielle M. Christensen
(74) *Attorney, Agent, or Firm* — CANTOR COLBURN LLP

(57) ABSTRACT

An aircraft motor assembly is provided and includes a high-power gear, a rear housing from which the high-power gear is exposed, a gear train, which is disposable in multiple orientations relative to the high-power gear, and which includes a first end configured to register with the high-power gear with the gear train disposed in one of the multiple orientations and a second end and a front housing configured to be installed about the high-power gear and the first end of the gear train and to accommodate the second end protruding outwardly from the front housing in a direction that corresponds to the one of the multiple orientations in which the gear train is disposed.

17 Claims, 6 Drawing Sheets

SPLIT FRONT HOUSING OF AIRCRAFT MOTOR FOR HIGH-POWER EXTRACTION FOR MOUNTED EXTERNAL ACCESSORIES

BACKGROUND

The present disclosure relates to aircraft motors and, more particularly, to a split front housing of an aircraft motor for enabling high-power extraction (i.e., from a low-power spool of a turbine engine) for mounted external accessories.

In an aircraft, motors and engines are used to turn propellors, fans and turboshafts during various flight operations. Motors and engines can also be used to drive generator operations. In any case, a gearbox is typically provided and configured to take rotational energy as an input from a motor or an engine and to transfer that rotational energy to a mounted accessory like a generator. In many cases, the housing of the motor and gearbox is unitary in structure. This means that an amount of power that can be transferred is often limited.

Beyond a gearbox having a single output mechanical power connection, a need therefore exists for a motor housing that offers a supplementary mechanical connection which allows for a higher amount of power to be transferred from the motor to the accessory or in reverse from the accessory to the aircraft motor (hybrid mode).

There is also a need for a drive train to be defined such that the positioning of the accessory in the aircraft compartment can be established. In addition, there is a need to deliver the proper accessory (e.g., electrical motor/generator) speed.

BRIEF DESCRIPTION

According to an aspect of the disclosure, an aircraft motor assembly is provided and includes a high-power gear, a rear housing from which the high-power gear is exposed, a gear train, which is disposable in multiple orientations relative to the high-power gear, and which includes a first end configured to register with the high-power gear with the gear train disposed in one of the multiple orientations and a second end and a front housing configured to be installed about the high-power gear and the first end of the gear train and to accommodate the second end protruding outwardly from the front housing in a direction that corresponds to the one of the multiple orientations in which the gear train is disposed.

In accordance with additional or alternative embodiments, the front housing partially overlaps with the rear housing.

In accordance with additional or alternative embodiments, the gear train includes a first layshaft, which comprises the first end of the gear train and which is receptive of rotational energy from the high-power gear and a second layshaft, which comprises the second end of the gear train and which is receptive of the rotational energy from the first layshaft and configured to transmit the rotational energy to a mounted accessory.

In accordance with additional or alternative embodiments, the first layshaft is a single-shaft double bevel gear and includes an internal male component and an external female component.

In accordance with additional or alternative embodiments, a mounted accessory includes an input gear disposable to register with the second end of the gear train.

In accordance with additional or alternative embodiments, the mounted accessory includes a generator.

In accordance with additional or alternative embodiments, the mounted accessory is offset from a rotational axis of an aircraft propeller or fan with which the aircraft motor assembly is connected.

In accordance with additional or alternative embodiments, the mounted accessory is parallel with a plane of an aircraft propeller or fan with which the aircraft motor assembly is connected.

In accordance with additional or alternative embodiments, the mounted accessory is orthogonal with respect to a plane of an aircraft propeller or fan with which the aircraft motor assembly is connected.

According to an aspect of the disclosure, an aircraft motor assembly is provided and includes a high-power gear, a gear train disposable in multiple orientations relative to the high-power gear and to register with the high-power gear when disposed in one of the multiple orientations, a split housing configured to be installed about the high-power gear and the gear train and to accommodate an outward protrusion of an end of the gear train in a direction that corresponds to the one of the multiple orientations in which the gear train is disposed and a mounted accessory disposable to register with the end of the gear train and which is orientable in correspondence with the one of the multiple orientations in which the gear train is disposed and the direction in which the end of the gear train protrudes outwardly.

In accordance with additional or alternative embodiments, the gear train includes a first layshaft, which includes the first end of the gear train and which is receptive of rotational energy from the high-power gear and a second layshaft, which includes the second end of the gear train and which is receptive of the rotational energy from the first layshaft and configured to transmit the rotational energy to a mounted accessory.

In accordance with additional or alternative embodiments, the mounted accessory includes a generator.

In accordance with additional or alternative embodiments, the mounted accessory is offset from a rotational axis of an aircraft propeller or fan with which the aircraft motor assembly is connected.

In accordance with additional or alternative embodiments, the mounted accessory is parallel with a plane of an aircraft propeller or fan with which the aircraft motor assembly is connected.

In accordance with additional or alternative embodiments, the mounted accessory is orthogonal with respect to a plane of an aircraft propeller or fan with which the aircraft motor assembly is connected.

According to an aspect of the disclosure, a method of building an aircraft motor assembly is provided and includes exposing a high-power gear from a rear housing, registering a gear train with the high-power gear, disposing the gear train, with the gear train registered with the high-power gear, in one of multiple orientations relative to the high-power gear, installing a front housing about the high-power gear and the gear train and configuring the front housing to accommodate an outward protrusion of a second end of the gear train in a direction that corresponds to the one of the multiple orientations in which the gear train is disposed.

In accordance with additional or alternative embodiments, the method further includes determining an orientation of a mounted accessory, wherein the one of the multiple orientations corresponds with the orientation of the mounted accessory.

In accordance with additional or alternative embodiments, the orientation of the mounted accessory is characterized in that the mounted accessory is offset from a rotational axis of an aircraft propeller or fan with which the aircraft motor assembly is connected.

In accordance with additional or alternative embodiments, the orientation of the mounted accessory is characterized in that the mounted accessory is parallel with a plane of an aircraft propeller or fan with which the aircraft motor assembly is connected.

In accordance with additional or alternative embodiments, the orientation of the mounted accessory is characterized in that the mounted accessory is orthogonal with respect to a plane of an aircraft propeller or fan with which the aircraft motor assembly is connected.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, an aircraft motor front reduction gearbox (RGB) housing is provided with a split construction and includes an inner rear housing and a front housing. The split housing configuration allows the installation of a high-power bevel gear that can be matched to a single branch triple reduction (SBTR) component for power extraction or hybrid mode. The SBTR component provides a wide range of potential speed adjustments to reach a required speed at the output from the available power gear speeds. Once the high-power bevel gear is installed, the front RGB housing and the SBTR component can be installed. The high-power bevel gear in combination with the SBTR component, can transfer a significant amount of power to a mounted external accessory, such as a generator. In some cases, substantially more horsepower can be produced as compared to conventional aircraft motors. Moreover, the split housing construction and the SBTR component cooperatively allow for an orienting of mounted accessories in various manners. This, in turn, allows the mounted accessory to have various orientations relative to the aircraft motor. The various orientations of the mounted external accessory include, but are not limited to, being offset from a rotational axis of a propellor or fan, being parallel with a plane of the propellor or fan and being orthogonal with respect to the plane of the propellor or fan.

Figure 1:
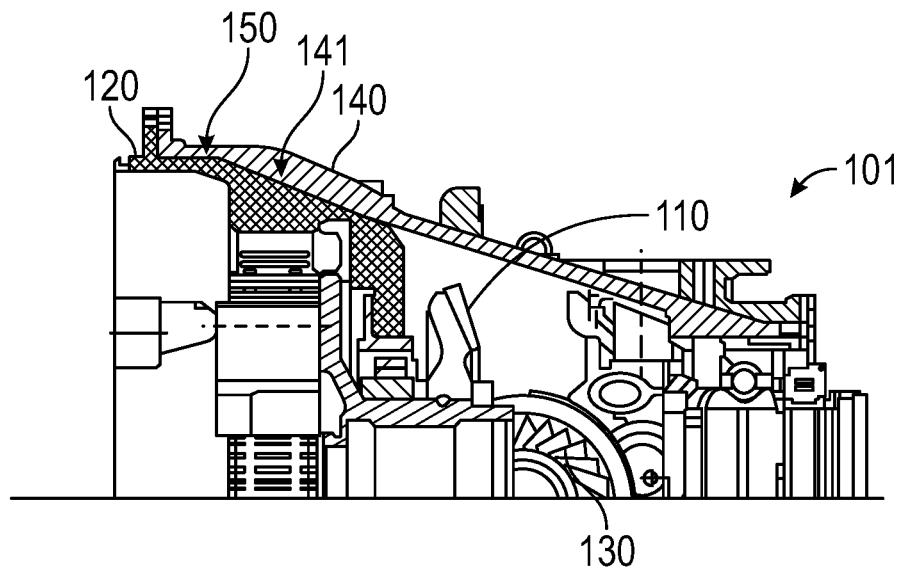
FIG. 1 is a partial side view of an aircraft motor assembly with a split housing in accordance with embodiments.
Figure 2:
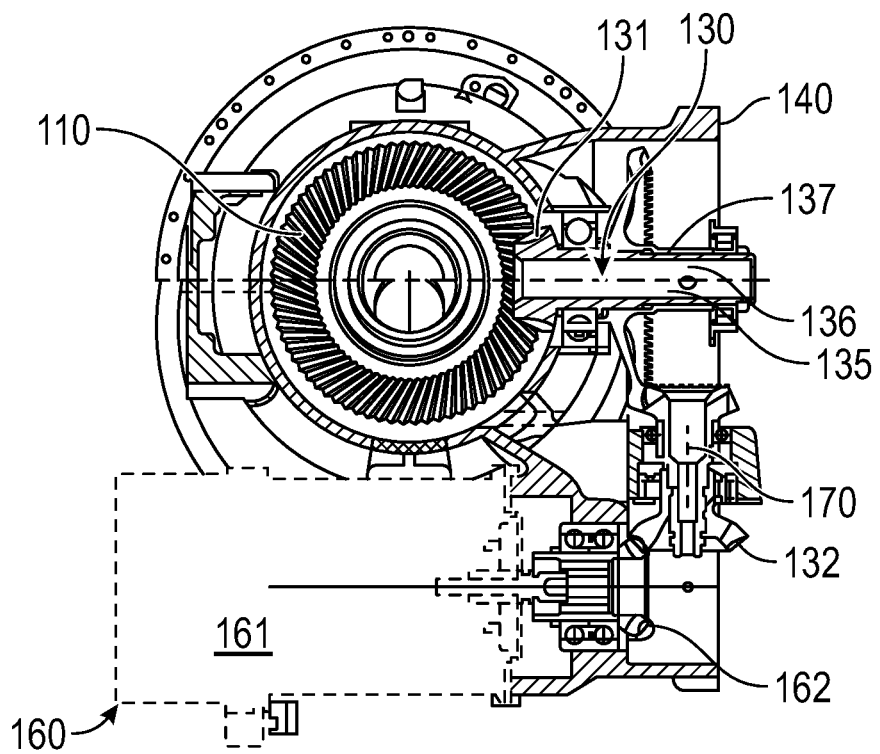
FIG. 2 is a cutaway front view of the aircraft motor assembly with a gear train and a mounted accessory in accordance with embodiments.

With reference to FIGS. 1 and 2, an aircraft motor assembly 101 is provided and includes a high-power gear 110, a rear housing 120 from which the high-power gear 110 is exposed, a gear train 130 having a first end 131 with a high-power gear, which is disposed to register with the high-power gear 110, and a second end 132 with a high-power gear and a front housing 140. The front housing 140 is installed about the high-power gear 110 and the first end 131 of the gear train 130. The front housing 140 is also installed partially about the rear housing 120 whereby the front housing 140 partially overlaps and contacts with the rear housing 120 along a contact surface 141. The rear housing 120 and the front housing 140 thus form a split housing 150. The aircraft motor assembly 101 can further include a mounted assembly 160, such as a generator 161, which includes an input gear 162.

The first end 131 of the gear train 130 is configured to register with the high-power gear 110. When the first end 131 of the gear train 130 is registered with the high-power gear 110, the gear train 130 is disposable in any one of multiple orientations relative to the high-power gear 110. The front housing 140 is configured to be installed about the high-power gear 110 and the first end 131 of the gear train 130 and is formed to define multiple openings 142 (see FIGS. 3A and 3B to be described below). The multiple openings 142 are positioned to accommodate the second end 132 of the gear train protruding outwardly from the front housing 140 in a direction D (see FIGS. 3A and 3B to be described below) that corresponds to the one of the multiple orientations in which the gear train 130 is disposed.

For the one of the multiple openings 142 that accommodates the outward protrusion of the gear train 130 in an embodiment, the front housing 140 can further include bearing seals (not shown) that are disposed to form a seal about the gear train 130 and to support rotation of the gear train 130. For each of the multiple openings 142 that does not accommodate the gear train 130, the front housing 140 can include a cover (not shown) that covers and seals the empty opening 142.

The gear train 130 can include a first layshaft 135 and a second layshaft 170. The first layshaft 135 can be provided as a single-shaft double bevel gear, where a first end of the single-shaft double bevel gear is a bevel gear and serves as the first end 131 of the gear train and a second end of the single-shaft double bevel gear is opposite the first end and is also a bevel gear. In any case, the first layshaft 135 is disposed and configured to receive rotational energy from the high-power gear 110. The second layshaft 175 can be provided as a tower shaft pinion and gear, with a beveled first end that registers with the second end of the single-shaft double bevel gear and a second end that is opposite the first end and that is also a bevel gear that can serve as the second end 132 of the gear train 130. The first and second layshafts 135 and 170—can be configured with an increasing or decreasing gear ratio as compared to the high-power gear 110. In any case, the first layshaft 135 is disposed and configured to receive rotational energy from the high-power gear 110 and the second layshaft 170 is disposed and configured to receive rotational energy from the first layshaft 135 and to transmit the rotational energy to the mounted accessory 160 via the input gear 162.

As shown in FIG. 2, the first layshaft 135 includes a male external spline 136 which mates with a female internal spline 137. When the gear train 130 is installed in the aircraft motor assembly 101, the interfaces of the splines 136 and 137 allow the first layshaft 135 to rotate as a unitary element.

Figure 3A:
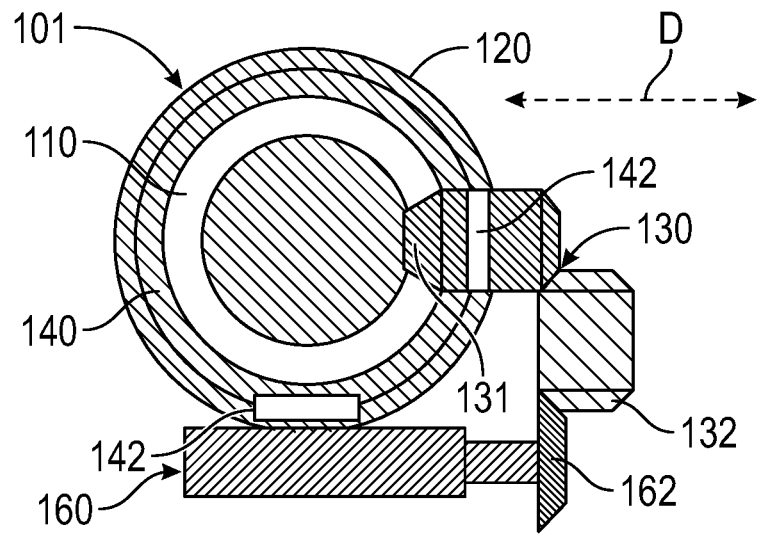
FIGS. 3A and 3B are schematic illustrations of an aircraft motor assembly in which a gear train and a mounted accessory have multiple orientations in accordance with embodiments.
Figure 3B:
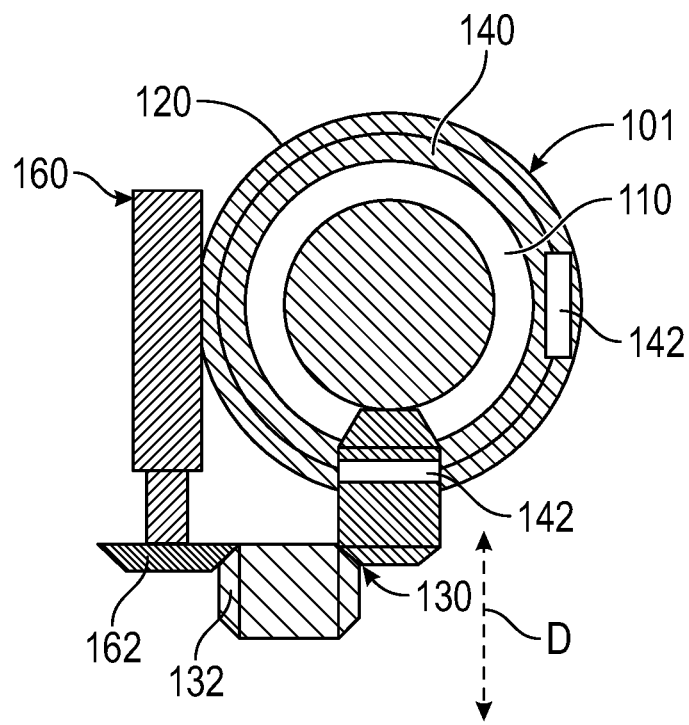

With reference to FIGS. 3A and 3B, examples of multiple orientations of the gear train 130 are illustrated. As shown in FIG. 3A, the first end 131 of the gear train 130 registers with the high-power gear 110 and the gear train 130 extends laterally in direction D to protrude through opening 142 that is formed in the front housing 140. The empty opening 142 is covered and sealed. The gear train 130 then extends downwardly and the second end 132 of the gear train 130 registers with input gear 162 of mounted accessory 160, which extends in parallel with direction D. As shown in FIG. 3B, the first end 131 of the gear train 130 registers with the high-power gear 110 and the gear train 130 extends downwardly in direction D to protrude through opening 142 that is formed in the front housing 140. The empty opening 142 is covered and sealed. The gear train 130 then extends laterally and the second end 132 of the gear train 130 registers with input gear 162 of mounted accessory 160, which extends in parallel with direction D.

Due to sizes of the first layshaft 135 and the second layshaft 170, the gear train 130 is configured to transfer a substantial amount of power from the high-power gear 110. This is a substantially greater amount of power than could be transferred from the high-power gear 110 in conventional motor assemblies lacking the split housing 150 (power transfer in conventional motor assemblies is limited to relatively low amount of power due to the relatively lack of capacity in conventional gearing). In addition, in accordance with embodiments, a capacity for power transfer of the gear train 130 is at least six times or more than a power transfer capacity of corresponding features of conventional motor assemblies.

With continued reference to FIGS. 1 and 2, 3A and 3B and with additional reference to FIGS. 4-8, a method of building an aircraft motor assembly, such as the aircraft motor assembly 101 described above, is provided. The method particularly demonstrates that the construction of the split housing 150 allows the gear train 130 to have an orientation relative to the split housing 150 and the aircraft motor assembly 101 that is one of multiple available orientations, which, in turn, allows the mounted accessory 160 to having a variable orientation that corresponds to the orientation of the gear train.

Figure 5:
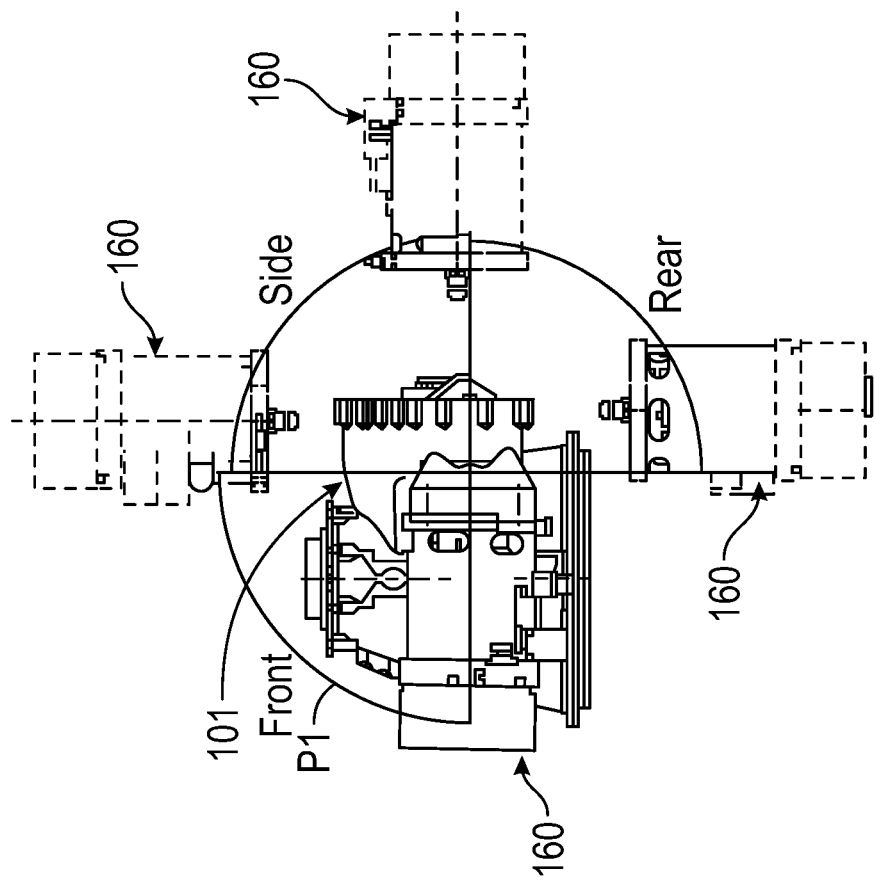
FIG. 5 is a front view of an aircraft motor assembly with a mounted accessory offset from a rotational axis and parallel with a plane of a propeller or fan in accordance with embodiments.
Figure 4:
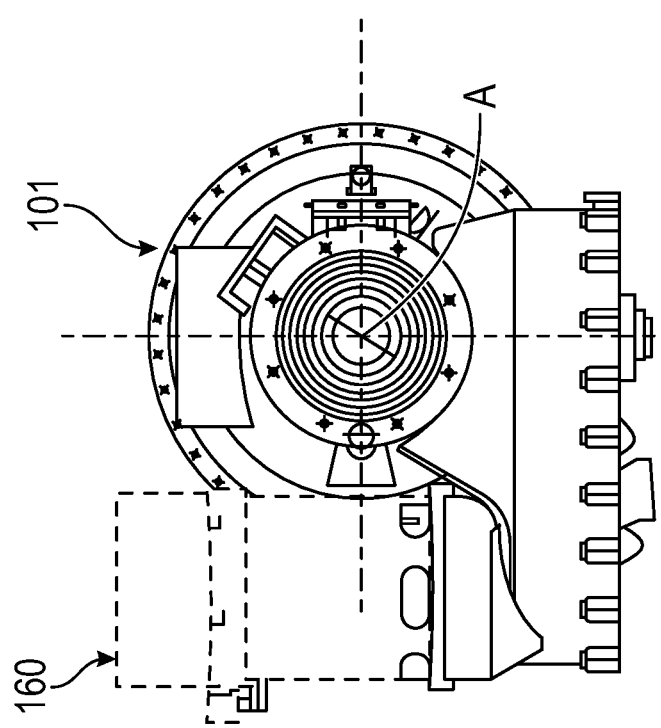
FIG. 4 is a front view of an aircraft motor assembly with a mounted accessory offset from a rotational axis of a propeller or fan in accordance with embodiments.
Figure 6:
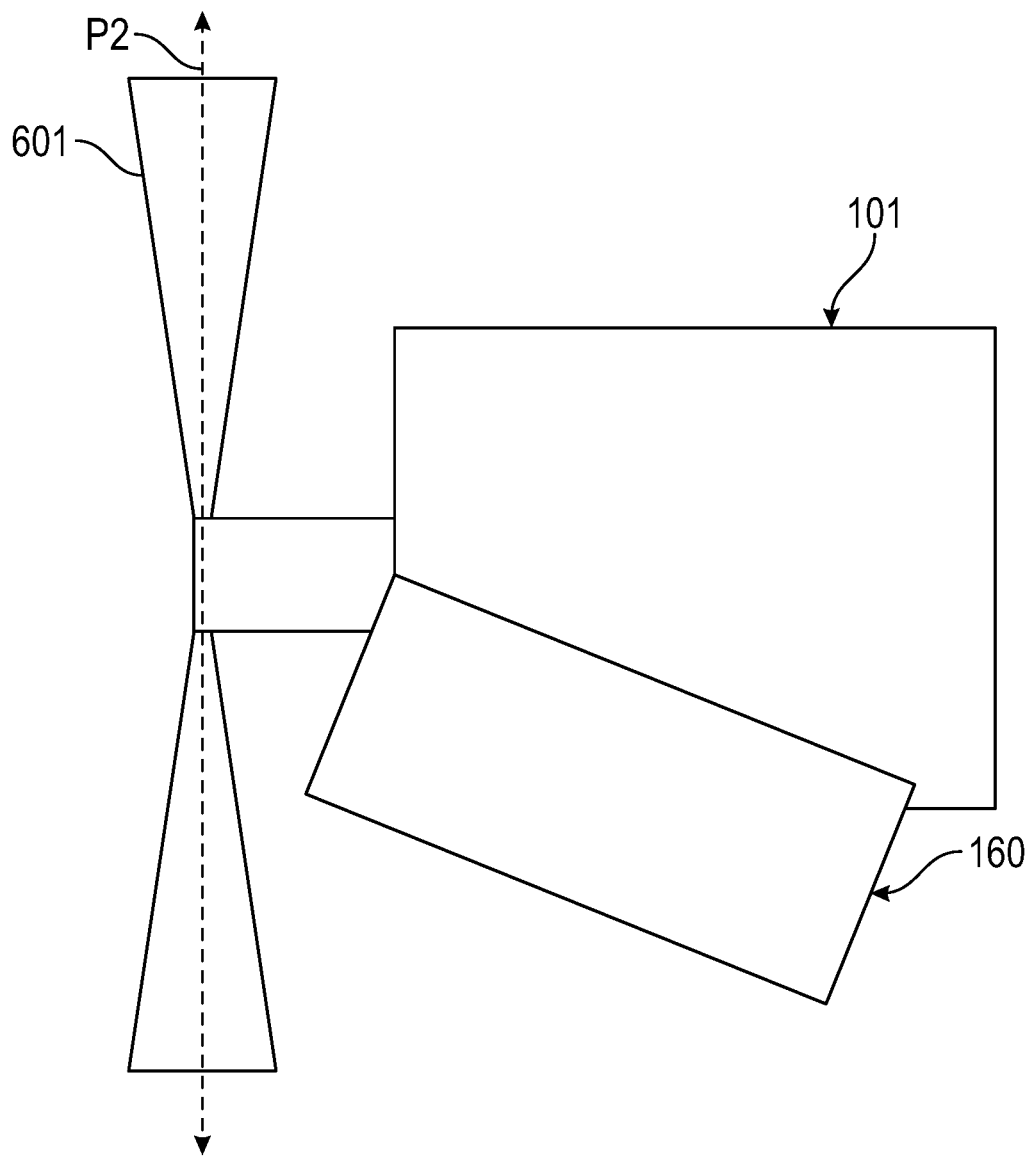
FIG. 6 is a front view of an aircraft motor assembly with a mounted accessory offset from a rotational axis and orthogonal to a plane of a propeller or fan in accordance with embodiments.

As shown in FIGS. 4-6, the orientation of the mounted accessory 160 can be characterized in that the mounted accessory 160 is offset from a rotational axis A of an aircraft propeller or fan with which the aircraft motor assembly 101 is connected (see FIG. 4), in that the mounted accessory 160 is parallel with and displaced from a plane P1 of an aircraft propeller or fan with which the aircraft motor assembly 101 is connected (see FIG. 5 in which displacement of the mounted accessory 160 from the plane P1 is into/out of the drawing) and/or in that the mounted accessory 160 is displaced from and orthogonal with respect to a plane P2 of an aircraft propeller or fan 601 with which the aircraft motor assembly 101 is connected (see FIG. 6).

Figure 7:
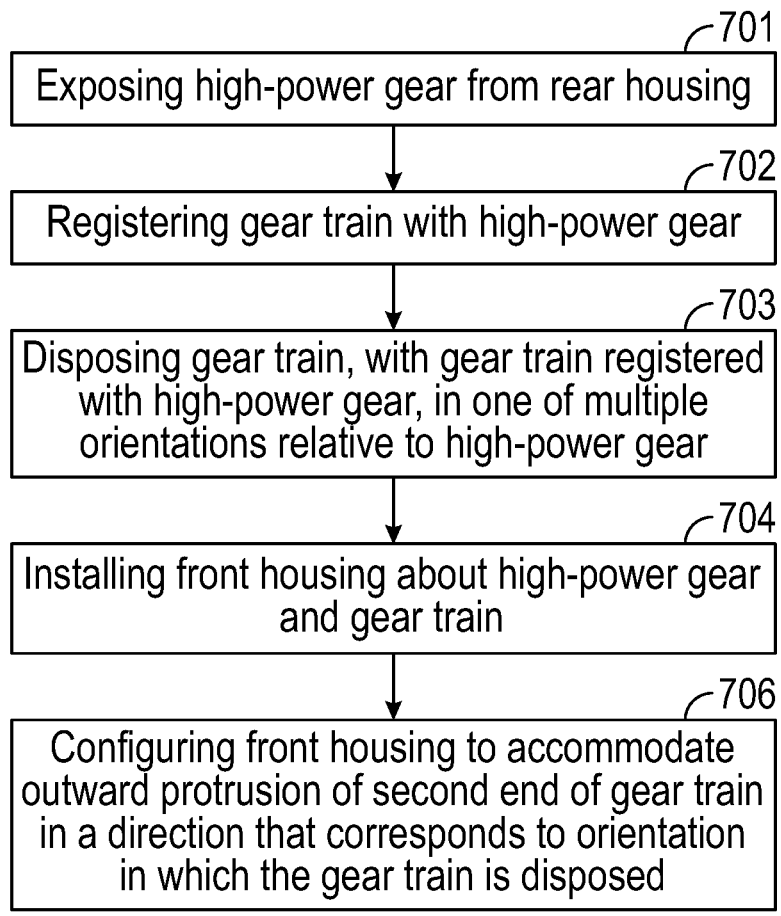
FIG. 7 is a flow diagram illustrating a method of building an aircraft motor assembly in accordance with embodiments.

As shown in FIG. 7, the method includes exposing a high-power gear from a rear housing (block 701), registering a gear train with the high-power gear (block 702), disposing the gear train, with the gear train registered with the high-power gear, in one of multiple orientations relative to the high-power gear (block 703), installing a front housing about the high-power gear and the gear train (block 704) and configuring the front housing to accommodate an outward protrusion of a second end of the gear train in a direction that corresponds to the one of the multiple orientations in which the gear train is disposed (block 705).

Figure 8:
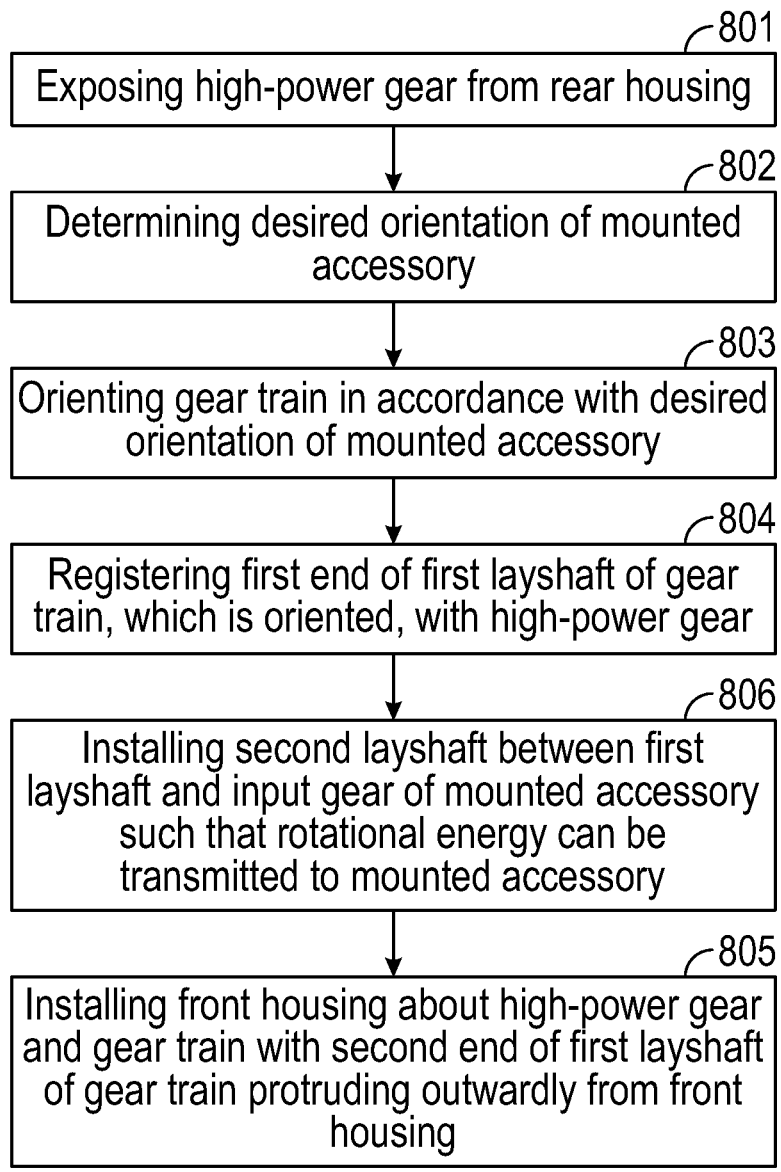
FIG. 8 is a flow diagram illustrating a method of building an aircraft motor assembly in accordance with embodiments.

As shown in FIG. 8, an alternate form of the method includes exposing a high-power gear from a rear housing (block 801), determining a desired orientation of a mounted accessory (block 802), which is to be installed with the aircraft motor assembly, relative to the aircraft motor assembly, orienting a gear train in accordance with the desired orientation of the mounted accessory (block 803), registering a first end of a first layshaft of the gear train, which is oriented in block 803, with the high-power gear (block 804) and installing a front housing about the high-power gear and the first end of the first layshaft of the gear train with a second end of the first layshaft of the gear train protruding outwardly from the front housing (block 805). The method can further include installing a second layshaft of the gear train between the first layshaft and an input gear of the mounted accessory such that the second layshaft is configured to transfer rotational energy to the mounted accessory from the first layshaft (block 806).

Technical effects and benefits of the present disclosure are the provision of an aircraft motor with a split construction including a rear housing and a front housing. The split construction allows a gear train to register with a high-power gear of the aircraft motor prior to the front housing being installed. In addition, the gear train can have various orientations, which, in turn, allows a mounted external accessory, such as a generator, to have correspondingly various orientations.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An aircraft motor assembly, comprising:
a high-power gear;

a rear housing from which the high-power gear is exposed;

a gear train, which is disposable in multiple orientations relative to the high-power gear, and which comprises a first end configured to register with the high-power gear with the gear train disposed in one of the multiple orientations and a second end; and a front housing configured to be installed about the high-power gear and the first end of the gear train and to accommodate the second end protruding outwardly from the front housing in a direction that corresponds to the one of the multiple orientations in which the gear train is disposed, wherein the gear train comprises:

a first layshaft, which comprises the first end of the gear train and which is receptive of rotational energy from the high-power gear and which is a single-shaft double bevel gear comprising an internal male component and an external female component; and a second layshaft, which comprises the second end of the gear train and which is receptive of the rotational energy from the first layshaft and configured to transmit the rotational energy to a mounted accessory.

2. The aircraft motor assembly according to claim 1, wherein the front housing partially overlaps with the rear housing.

3. The aircraft motor assembly according to claim 1, further comprising a mounted accessory comprising an input gear disposable to register with the second end of the gear train.

4. The aircraft motor assembly according to claim 3, wherein the mounted accessory comprises a generator.

5. The aircraft motor assembly according to claim 3, wherein the mounted accessory is offset from a rotational axis of an aircraft propeller or fan with which the aircraft motor assembly is connected.

6. The aircraft motor assembly according to claim 3, wherein the mounted accessory is parallel with a plane of an aircraft propeller or fan with which the aircraft motor assembly is connected.

7. The aircraft motor assembly according to claim 3, wherein the mounted accessory is orthogonal with respect to a plane of an aircraft propeller or fan with which the aircraft motor assembly is connected.

8. An aircraft motor assembly, comprising:

a high-power gear;

a gear train disposable in multiple orientations relative to the high-power gear and to register with the high-power gear when disposed in one of the multiple orientations;

a split housing configured to be installed about the high-power gear and the gear train and to accommodate an outward protrusion of an end of the gear train in a direction that corresponds to the one of the multiple orientations in which the gear train is disposed; and a mounted accessory disposable to register with the end of the gear train and which is orientable in correspondence with the one of the multiple orientations in which the gear train is disposed and the direction in which the end of the gear train protrudes outwardly, wherein the gear train comprises:

a first layshaft, which comprises the first end of the gear train and which is receptive of rotational energy from the high-power gear and which is a single-shaft double bevel gear comprising an internal male component and an external female component; and a second layshaft, which comprises the second end of the gear train and which is receptive of the rotational energy from the first layshaft and configured to transmit the rotational energy to the mounted accessory.

9. The aircraft motor assembly according to claim 8, wherein the mounted accessory comprises a generator.

10. The aircraft motor assembly according to claim 8, wherein the mounted accessory is offset from a rotational axis of an aircraft propeller or fan with which the aircraft motor assembly is connected.

11. The aircraft motor assembly according to claim 8, wherein the mounted accessory is parallel with a plane of an aircraft propeller or fan with which the aircraft motor assembly is connected.

12. The aircraft motor assembly according to claim 8, wherein the mounted accessory is orthogonal with respect to a plane of an aircraft propeller or fan with which the aircraft motor assembly is connected.

13. A method of building an aircraft motor assembly, the method comprising:

exposing a high-power gear from a rear housing;

registering a gear train with the high-power gear;

disposing the gear train, with the gear train registered with the high-power gear, in one of multiple orientations relative to the high-power gear;

installing a front housing about the high-power gear and the gear train; and configuring the front housing to accommodate an outward protrusion of a second end of the gear train in a direction that corresponds to the one of the multiple orientations in which the gear train is disposed, wherein the gear train comprises:

a first layshaft, which comprises the first end of the gear train and which is receptive of rotational energy from the high-power gear and which is a single-shaft double bevel gear comprising an internal male component and an external female component; and a second layshaft, which comprises the second end of the gear train and which is receptive of the rotational energy from the first layshaft and configured to transmit the rotational energy to a mounted accessory.

14. The method according to claim 13, further comprising determining an orientation of the mounted accessory, wherein the one of the multiple orientations corresponds with the orientation of the mounted accessory.

15. The method according to claim 14, wherein the orientation of the mounted accessory is characterized in that the mounted accessory is offset from a rotational axis of an aircraft propeller or fan with which the aircraft motor assembly is connected.

16. The method according to claim 14, wherein the orientation of the mounted accessory is characterized in that the mounted accessory is parallel with a plane of an aircraft propeller or fan with which the aircraft motor assembly is connected.

17. The method according to claim 14, wherein the orientation of the mounted accessory is characterized in that the mounted accessory is orthogonal with respect to a plane of an aircraft propeller or fan with which the aircraft motor assembly is connected.

* * * * *